O. E. WARDNER.
BUCKLE.
APPLICATION FILED JULY 22, 1921.
1,394,380.
Patented Oct. 18, 1921.
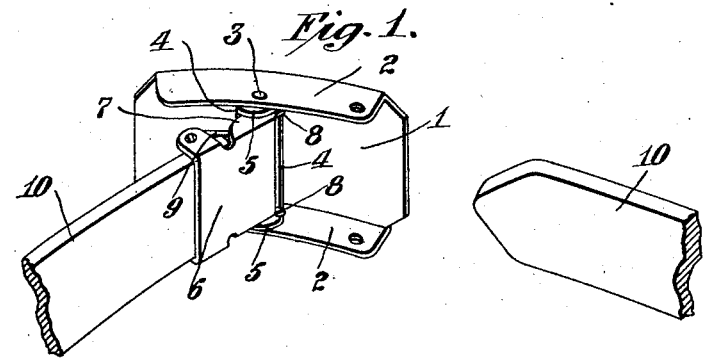
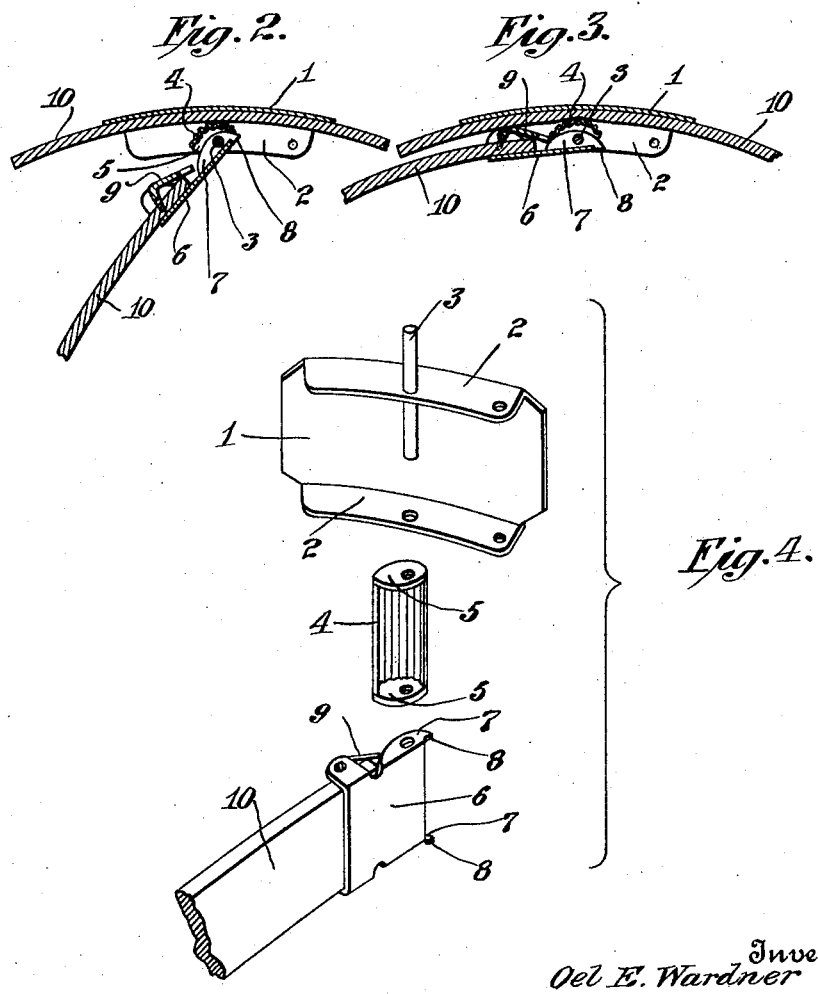
Inventor
Oel E. Wardner

UNITED STATES PATENT OFFICE.

OEL E. WARDNER, OF NEW BRITAIN, CONNECTICUT, ASSIGNOR TO THE TRAUT & HINE MFG. COMPANY, OF NEW BRITAIN, CONNECTICUT, A CORPORATION OF CONNECTICUT.

BUCKLE.

1,394,380. Specification of Letters Patent. Patented Oct. 18, 1921.

Application filed July 22, 1921. Serial No. 486,745.

*To all whom it may concern:*

Be it known that I, OEL E. WARDNER, a citizen of the United States of America, residing at New Britain, Connecticut, have invented a new and useful Buckle, of which the following is a specification.

My invention relates to improvements in buckles particularly of the type adapted for use with belts. The object is to provide a simple and effective construction; to improve the gripping means whereby the adjustable end of a belt may be effectively secured in any adjusted position, and to so construct the various parts that they all may be made and assembled very quickly and advantageously.

In the drawings:

Figure 1 is a perspective view of a buckle in position to receive the free end of a belt;

Fig. 2 is a sectional view showing the gripping member in position to permit adjustment of the belt;

Fig. 3 is a view similar to Fig. 2, showing the gripping member gripping the belt, and Fig. 4 is a perspective view showing parts of the buckle relatively separated.

1 represents the front plate of the buckle having two rearwardly extended flanges 2—2 along the upper and lower rear edges. 3 represents a pivot extending from flange to flange and located intermediate the length of the same preferably near the middle. 4 represents a cam formed of sheet metal channeled longitudinally to form a segmental gripping surface preferably knurled on its exterior. At the ends of the channeled cam are ears or trunnions 5—5 for mounting said cam to turn on the pivot pin 3. 6 is a lever plate having ears 7—7 which are also mounted to turn on the pivot 3 the same being located between the ears 5—5 of the cam 4. 8—8 are knock off shoulders on the ears 7—7. 9 is a clamping lever pivotally mounted on the plate 6 at its free end and constituting one simple and effective means for securing one end of the belt rigidly to the buckle. When the lever 6 stands at an angle to the front plate 1, the free end of the belt may be slid through the space between the cam 7 and the back of the plate 1. When the plate 6 is straightened out into line with the flanges 2—2 it swings the cam 4 into engagement with the belt so as to pinch the same tightly against the back of the front plate and hold said belt in adjusted position. The cam 4 is preferably eccentrically mounted on the pivot 3 as shown in the drawings so that as the tension on the belt increases and tends to turn the cam, any turning movement will tend to increase the gripping pressure to resist the added tension. 10 represents the belt.

It will be observed that the plate 6 has a limited free swinging movement on the pivot 3 independently of the cam, and hence when the parts are in operative position a slight swinging movement of said plate 6 as might accidentally occur will not dislodge the cam and release the belt.

I claim:

1. A buckle comprising a plate having rearwardly extending flanges at its upper and lower edges forming a belt passage therebetween, a pivot extending from flange to flange intermediate the ends thereof, a cam comprising a channeled sheet metal member, trunnions at the end thereof mounted to turn on said pivot, a plate having ears at one end also mounted to turn on said pivot and located between said trunnions, said plate having a limited free swinging movement independently of said cam in both directions, and means for securing one end of the belt to said last mentioned plate.

2. A buckle comprising a plate having rearwardly extending flanges at its upper and lower edges forming a belt passage therebetween, a pivot extending from flange to flange intermediate the ends thereof, a cam comprising a channeled sheet metal member, trunnions at the end thereof mounted to turn on said pivot, a plate having ears at one end also mounted to turn on said pivot and located between said trunnions, said plate having a limited free swinging movement independently of said cam in both directions, and means for securing one end of the belt to said last mentioned plate, the outer or segmental surface of said channeled cam being roughened.

OEL E. WARDNER.